(12) United States Patent
Eyal et al.

(10) Patent No.: US 7,167,630 B2
(45) Date of Patent: Jan. 23, 2007

(54) BEAM SHAPER AND IMAGING HEAD HAVING BEAM SHAPERS

(75) Inventors: Ophir Eyal, Ramat Ha-Sharon (IL);
Moshe Liberman, Rishon-LeZion (IL);
Asaf Pellman, Pardes-Hanna (IL)

(73) Assignee: Kodak IL, Ltd., Herzlia (IL)

( * ) Notice: Subject to any disclaimer, the term of this patent is extended or adjusted under 35 U.S.C. 154(b) by 0 days.

(21) Appl. No.: 11/268,187

(22) Filed: Nov. 7, 2005

(65) Prior Publication Data

US 2006/0098934 A1  May 11, 2006

Related U.S. Application Data

(60) Provisional application No. 60/625,566, filed on Nov. 8, 2004.

(51) Int. Cl.
*G02B 6/10* (2006.01)
*F21V 7/04* (2006.01)

(52) U.S. Cl. .................. 385/146; 385/31; 385/38; 385/147; 385/901; 362/551; 362/552; 362/553; 362/554; 362/556

(58) Field of Classification Search .............. 385/115, 385/116, 117, 118, 119, 123, 146, 147, 33, 385/31, 38, 901; 362/551, 552, 553, 554, 362/556

See application file for complete search history.

(56) References Cited

U.S. PATENT DOCUMENTS

| | | | |
|---|---|---|---|
| 4,744,615 A * | 5/1988 | Fan et al. | 385/146 |
| 4,807,954 A | 2/1989 | Oyamada et al. | 385/38 X |
| 4,932,747 A * | 6/1990 | Russell et al. | 385/115 |
| 5,016,964 A * | 5/1991 | Donnelly | 385/119 |
| 5,337,380 A | 8/1994 | Darbon et al. | 385/28 |
| 5,668,903 A | 9/1997 | Neuberger et al. | 385/38 |
| 5,835,647 A * | 11/1998 | Fischer et al. | 385/31 |
| 5,963,687 A | 10/1999 | Schneider et al. | 385/31 |
| 6,385,371 B1 | 5/2002 | Li | 385/43 |
| 6,428,198 B1 * | 8/2002 | Saccomanno et al. | 362/559 |
| 6,519,387 B1 | 2/2003 | Sunagawa et al. | 385/33 |
| 6,921,909 B1 * | 7/2005 | Nagarkar et al. | 250/483.1 |
| 6,956,876 B1 | 10/2005 | Aquaro et al. | 372/6 |
| 2003/0210861 A1 | 11/2003 | Weiss et al. | 385/33 |
| 2004/0061770 A1 | 4/2004 | Pilossof et al. | 347/238 |

FOREIGN PATENT DOCUMENTS

| | | | | |
|---|---|---|---|---|
| EP | 0 992 343 A1 | 4/2000 | | 385/123 X |
| JP | 2001-264595 | 9/2001 | | 385/147 X |

OTHER PUBLICATIONS

Yuji Matsuura et al., "Beam Homogenizer for Hollow-Fiber Delivery System of Excimer Laser Light", Jun. 20, 2003, vol. 42, No. 18, Applied Optics, pp. 3505-3508.

* cited by examiner

*Primary Examiner*—Brian M. Healy
(74) *Attorney, Agent, or Firm*—Roland R. Schindler, II

(57) ABSTRACT

Beam shapers, imaging heads formed using such beam shapers and methods are provided that are adapted to shape a light beam for use in imaging. In accordance with one method described herein a light beam is received and the light beam is reflectively scrambled to form generally homogenous light having a non-circular shape. The homogenous light is delivered to a circular core multimode light path that shapes the light beam so that light exiting the circular core multimode light path comprises circular shaped homogenous light.

20 Claims, 4 Drawing Sheets

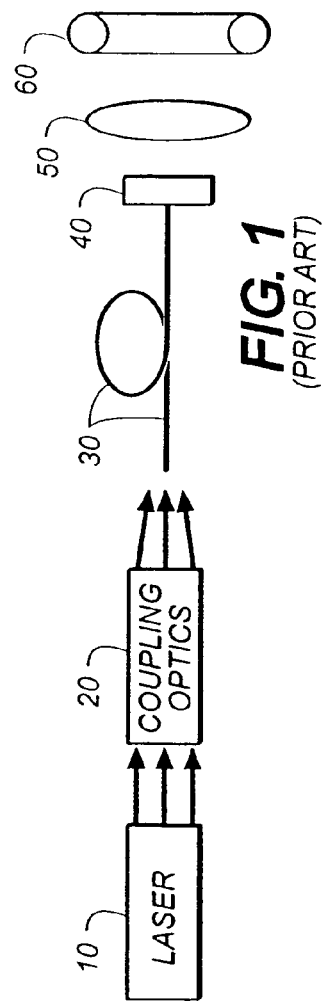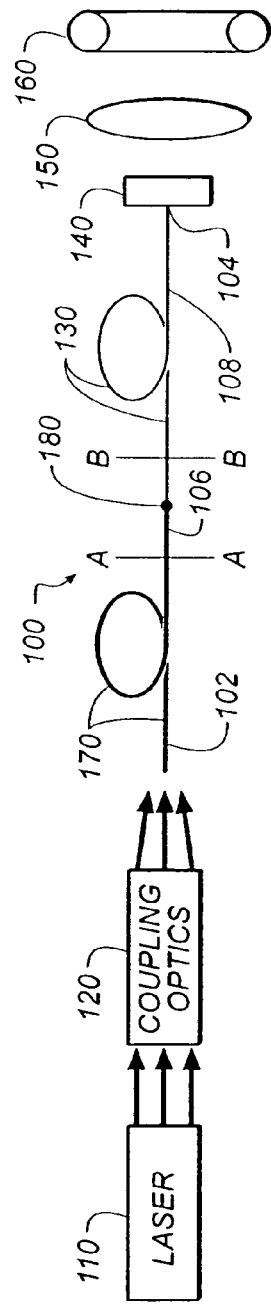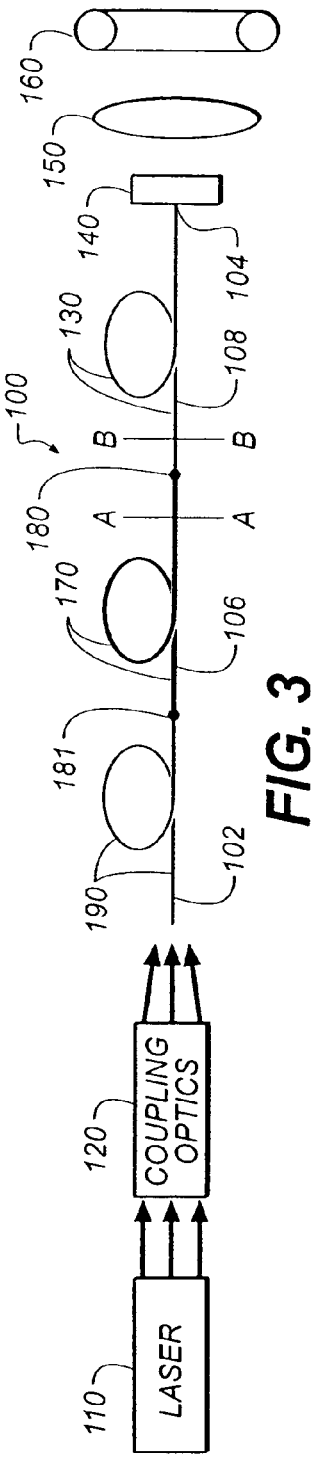

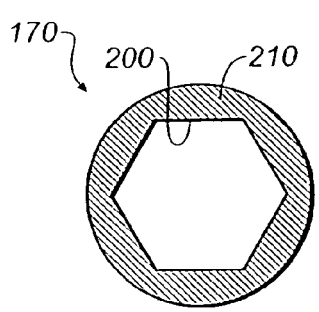
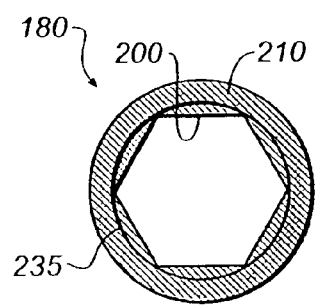
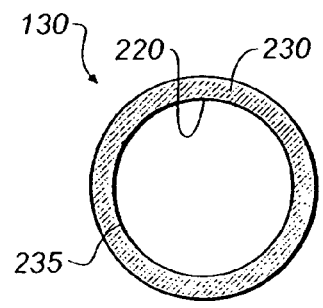
FIG. 4A  FIG. 4B  FIG. 4C
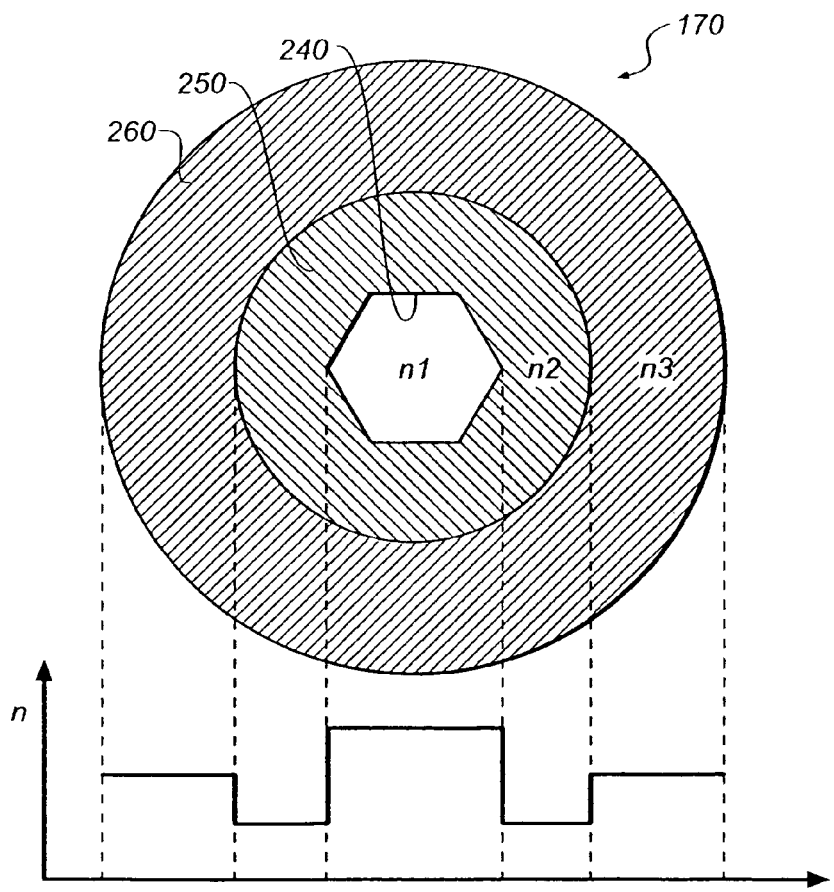
FIG. 5

BEAM SHAPER AND IMAGING HEAD HAVING BEAM SHAPERS

CROSS-REFERENCE TO RELATED APPLICATIONS

This is a 111A application of U.S. Provisional Application Ser. No. 60/625,566 filed Nov. 8, 2004, entitled A PROPOSAL FOR FIBER OPTIC BEAM SHAPER.

FIELD OF THE INVENTION

The present invention relates to beam shapers, to imaging heads formed using such beam shapers and to methods adapted to shape a light beam for use in imaging.

BACKGROUND OF THE INVENTION

Optical heads for imaging a plurality of light spots on a light sensitive medium such as printing plates often incorporate, as a light source, an array of pigtailed laser diodes. Each laser diode is optically coupled to a proximal tip of a multimode optical fiber. The distal ends of the optical fibers are supported in a linear array by mechanical means such as V-groove plates.

FIG. 1 is a schematic representation of such a prior art imaging system comprising a light source 10, e.g. laser and coupling optics 20 coupled to a multimode optical fiber 30 having a circular core shape. The distal end of multimode optical fiber 30 is supported by mechanical support 40, such as micro-machined V-grooves, and emits light through a telecentric lens 50 onto an imaging surface 60. Imaging surface 60 may be a photosensitive printing plate, including a thermally ablative printing plate.

An important characteristic of any fiber-coupled laser diode is the general distribution of light energy exiting from a tip face at a distal end of the multimode optical fiber. Preferably, this distribution is relatively even or homogenous. The homogeneity of the distribution depends on a variety of parameters such as the quality of the supplied laser light which can for example depend upon way the laser diode is modulated, the optical characteristics of the optical coupling between the laser diode and the optical fiber, the length of the optical fiber, the bending along the fiber, etc. which may cause non-uniform and time-dependent energy distribution of the light emerging from the distal end of the multimode optical fiber. This often leads to unpredictable energy distribution in the writing spot and to undesired effects on the image. It is well known that the radiation at the output of a regular circular multimode fiber is not steep, not homogeneous and has many modes. Furthermore, the mode structure of this radiation is dependent on the fiber lay and changes when the fiber is moved, as happens in many imaging machines.

Several ways of avoiding this effect are mentioned in the prior art. For example, EP 0992343 A1 to Presstek Inc. uses a controlled-angle diffuser. The diffuser introduces scrambling in the angular energy distribution and thus smoothes it. This approach, however, cannot correct asymmetrical spatial energy distributions, such as doughnut-mode energy distributions.

Another way is to use a non-circular hollow waveguides as described, for example, in the article entitled "Beam Homogenizer for Hollow-Fiber Delivery System of Excimer Laser Light", published in Applied Optics, volume 42, no. 18, Jun. 20, 2003. A hollow waveguide is usually made from silicon coated with a reflecting metal layer. However, hollow wave-guides which use the principle of reflection, absorb part of the guided light converting it to heat. This wastes energy and can negatively influence the shape of the wave-guide or the direction of the wave-guide.

U.S. Pat. No. 6,519,387 to Sunagawa et al. claims the use of an elongated core shape at the distal end of a fiber to improve beam characteristics. However, the use of non-circular cores at the distal ends of the fibers causes the spot configuration of the scanned beam to be short in one direction rather than circular. Further, for example, it is harder to align and orient the fibers in mechanical supports such as V-grooves.

Thus, there is a need in the printing arts and in other fields for a system that provides homogenized steep profile of radiation from a fiber which has a circular core. This may improve the image quality of printing systems.

SUMMARY OF THE INVENTION

In one aspect of the invention, an optical path for use with a laser source is provided. The optical path comprises: a beam shaper multimode optical path having a non-circular core optically coupled at one end to the laser source, said non-circular core being shaped to repeatedly reflect a light beam supplied by the laser source to homogenize the light beam; and a circular core multimode optical path optically coupled to the beam shaper multimode optical path to receive the homogenized light beam and to shape the homogenized light beam to provide a generally circular beam of homogenized light.

In another aspect of the invention, an optical imaging head is provided. The optical imaging head comprises: a plurality of laser sources; a plurality of optical paths each optical path having: beam shaper multimode optical fiber having a non-circular core optically coupled to at least one of said laser sources at a proximate face of the optical path; and a circular core multimode optical fiber optically coupled, at a first end, to the beam shaper multimode optical fiber and defining, at a second end, a distal face of the optical path. A mechanical support positions the distal face of each optical path at a predetermined location relative to other distal faces of the other ones of the plurality of optical paths. Wherein beam shaper multimode optical fiber reflects the beam of light from the at least one of said laser sources to provide a homogenous light beam and wherein said circular core multimode optical fiber shapes the homogeneous light beam into a circular shaped homogeneous light beam at the distal face.

In yet another aspect of the invention, a method for processing a light beam is provided. In accordance with this method, a light beam is received and the light beam is reflectively scrambled to form generally homogenous light having a non-circular shape. The homogenous light is delivered to a circular core multimode light path that shapes the light beam so that light exiting the circular core multimode light path comprises a circular shaped homogenous light.

BRIEF DESCRIPTION OF THE DRAWINGS

FIG. 1 is a schematic representation of a prior-art system;

FIG. 2 is a schematic representation of one embodiment an optical path;

FIG. 3 is a schematic representation of another embodiment of an optical path;

FIGS. 4A–4C are schematic cross-sectional views of exemplary optical fibers and a splice used in the embodiment of an optical path shown in FIG. 3;

FIG. 5 is a schematic representation of the cross section and refractive index profile of an exemplary fiber optic beam shaper which has a hexagonal core and two layers of cladding;

DETAILED DESCRIPTION OF THE INVENTION

Figure 6:
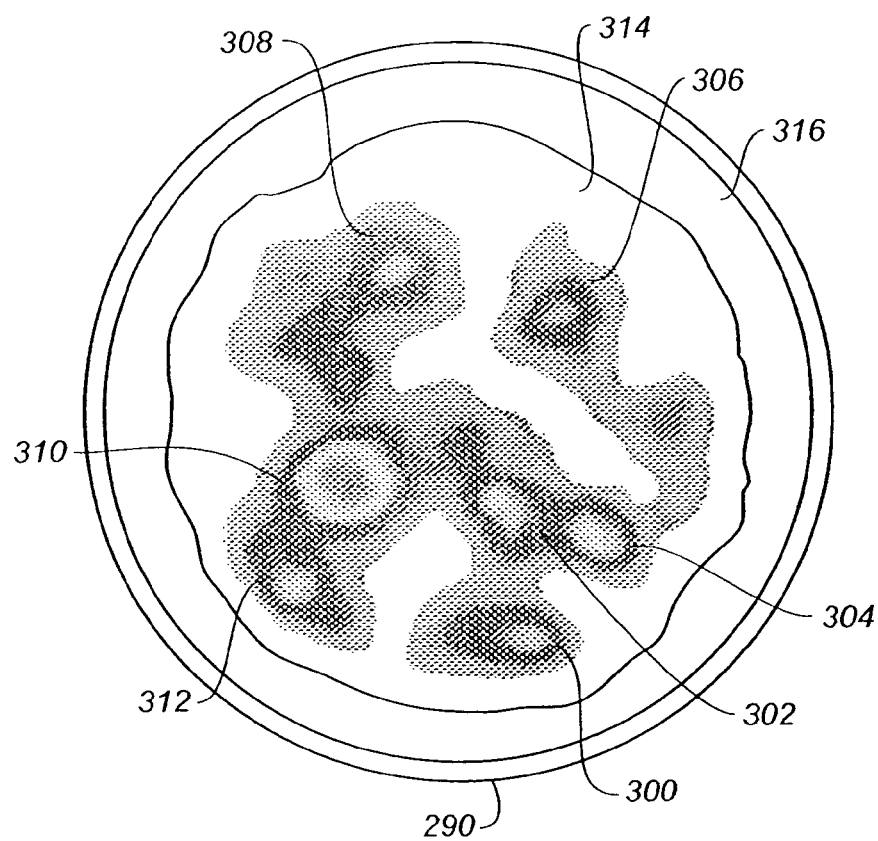
FIG. 6 illustrates a qualitative example of beam profile for a prior art multi-mode circular core optical fiber.

FIG. 2 is a schematic representation of a first embodiment of an optical path 100. In the embodiment of FIG. 2, a laser source 110 is coupled, by coupling optics 120 to optical path 100. Optical path 100 has a proximate face 102 for receiving a light beam from laser source 110 and coupling optics 120 and a distal face 104 from which light that has passed through optical path 100 is emitted. In the embodiment of FIG. 2, optical path 100 comprises a beam shaper multimode optical path 106 in the form of fiber optic beam shaper 170 that homogenizes the light beam and a circular core multimode optical path 108 in the form of a circular core multimode optical fiber 130 that shapes the homogenized light from fiber optic beam shaper 170 to provide a shaped and homogenized light. In the embodiment of FIG. 2, fiber optic beam shaper 170 comprises a multimode optical fiber with a non-circular core shape which scrambles the light beam supplied by laser source 110. This scrambling effect is achieved due to the multiple reflections that a light beam experiences while traveling through the non-circular core of the fiber optic beam shaper 170. The degree of scrambling is controlled by defining parameters such as the shape, the length and the numerical aperture of fiber optic beam shaper 170.

Fiber optic beam shaper 170 is typically formed from drawn silica. However, other materials can also be used. As will be discussed in greater detail below, fiber optic beam shaper 170 can optionally have a cladding. The cladding may be constructed to have an absorbing or depressed coating at any place along and around the cladding, in order to omit leaky or cladding modes that can cause undesired effects.

In the embodiment of FIG. 2, fiber optic beam shaper 170 works on the principle of total internal reflection, in which no power is absorbed, unlike hollow wave-guides, which use the principle of reflection and therefore absorb part of the guided light, converting it to heat. This difference is an especially important consideration when an optical path is used to carry relatively high power laser light beams. In certain embodiments, the following aspects of a fiber optic beam shaper 170 may be advantageous:

1. Fiber optic beam shaper 170 is a non-circular silica fiber, while a hollow light pipe is usually made from silicon coated with a metal layer. A silicon with a metal layer is typically less durable than a silica fiber.
2. Fiber optic beam shaper 170 can be used in situations where it is very difficult to use a hollow light pipe. For example, when the fiber tips are angled polished or angled cleaved (this is usually done in order to prevent back reflection from the fiber tip) it is practically very difficult to align a hollow light pipe relative to the angled cleaved fiber tips. Fiber optic beam shaper 170 thus enables one to angle polish the fiber tips very easily.
3. Fiber optic beam shaper 170 can be made with any core shape. As a practical matter, hollow light pipes can be constructed just in a limited number of shapes.

There are a variety of commercially available non-circular and optionally depressed fibers that can be adapted for the purpose of providing fiber optic beam shaper 170.

In the embodiment of FIG. 2, fiber optic beam shaper 170 is spliced or tapered at splicing point 180 to multimode optical fiber 130 having a circular core. In this embodiment, the splicing is provided by applying the circular core of multimode optical fiber 130 so that it circumscribes the non-circular shaped core of fiber optic beam shaper 170. The homogenized light that enters circular core multimode optical fiber 130 by way of such a splice emerges from an end of circular core multimode optical fiber that defines in this embodiment, distal face 104 of optical path 100. This light takes the form of a circular shaped beam of homogenized light. The circular shaped light beam of homogenized light emerging from distal face 104 is then imaged by an optical system 150 on an imaging surface 160, such as a photosensitive or thermally sensitive imaging surface or other image-receiving surface. Optical system 150 can comprise, for example, a telecentric lens.

Laser source 110 may be one of an individually addressable laser diode array or one of a number of fiber coupled diodes or any other conventional source of laser light of a type that can be carried by an optical path for use in imaging.

In the embodiment of FIG. 2, a splice is described as being used to join fiber optic beam shaper 170 and multimode optical fiber 130. In one embodiment, the splice can take the form of a taper. A splice is more reliable relative to optical connectors which are used for example by prior art U.S. Pat. No. 6,519,387. For example, a splice ensures a much lower attenuation of the optical power. Furthermore, the splice can also ensure that the numerical aperture of the radiation will not change. By providing a circular core at the distal face of multimode optical fiber 130 it is easier to align a plurality of such fibers in mechanical supports such as V-grooves of the type that are used to form imaging head 140 as illustrated in FIG. 2. This is due to the fact that there is no need to define the orientation of multimode optical fibers 130, as in the case of elongated-core-shaped fiber tips.

FIG. 3 is a schematic representation of another embodiment of an optical path 100. In this embodiment, fiber optic beam shaper 170 is spliced at points 180 and 181 between two multimode fibers 130 and 190 each having circular cores. In this embodiment, multimode fiber 190 optically couples fiber optic beam shaper 170 to laser source 110 and coupling optics 120 at a proximate face 102 so that optical path 100 will receive a light beam supplied by laser source 110. Fiber optic beam shaper 170 homogenizes the supplied light beam as is described generally above. As is also described generally above, circular core multimode optical fiber 130 carries and shapes the homogenized light to the distal face 104 of optical path 100 so that homogenous light having a circular profile emerges. It will be appreciated that the use of conventional circular core multimode fibers 130 and 190 simplifies the integration of optical path 100 into an imaging head 140, especially where such imaging head 140 uses multiple optical paths.

FIGS. 4A–4C are schematic representations of the cross-sections of fiber optic beam shaper 170 and multimode optical fiber 130 of FIG. 3 along cutting line A—A, at splicing point 180, and along cutting line B—B, respectively. In FIG. 4A, fiber optic beam shaper 170 is shown having a hexagonal core 200 and circular cladding 210. In FIG. 4C, multimode optical fiber 130 is shown having a circular core 220 and cladding 230 and in FIG. 4B, both fibers 130 and 170 are shown spliced, so that hexagonal core 200 of fiber optic beam shaper 170 is circumscribed by a circumference 235 of circular core 220 of multimode optical fiber 130.

Coupling optics 120 used in the embodiments of FIGS. 2 and 3 may be constructed from refractive or reflective optical elements such as mirrors or lenses. Furthermore, coupling optics 120 may be formed to be part of fiber optic beam shaper 170 or multimode fiber 190. This can be done by shaping the proximal tip of fiber optic beam shaper 170 or multimode fiber 190, for example, by forming a chisel shaped fiber tip.

FIG. 5 is a schematic representation of the cross section and refractive index profile of a fiber which has a hexagonal core and two cladding layers. Such a structure may advantageously be used as a fiber optic beam shaper 170 of the present invention. As illustrated in FIG. 5, this embodiment of fiber optic beam shaper 170 has a hexagonal non-circular core 240, a first cladding 250 and an outer cladding 260. In FIG. 5, n1 through n3 represent the indices of refraction for, respectively, core 240, first cladding 250, and outer cladding 260. In this embodiment, n1 is the highest index of refraction and n2 is the lowest. Outer cladding 260 may be produced of transparent material, such as glass, in which embodiment it will serve as a depressed cladding. Alternatively, outer cladding 260 may be produced of a light absorbing material. Both embodiments ensure that only the non-circular core 240 will guide the radiation.

The technology of constructing fibers with non-circular cores and fibers with one or more layer of clad is well mastered by many companies around the world, for example by Nufern (www.nufern.com). These companies, for example, draw fibers with non-circular cross sections in order to pump fiber lasers. It will be appreciated that generally speaking, the number of modes in a light beam carried by an optical fiber is dependent, amongst others, on the size of the core. The larger the core size, the more modes carried by the fiber. This means that a light beam in a fiber having a large core size is typically more homogeneous and steeper than a similar light beam in an optical fiber having a smaller core size. FIGS. 6–9 illustrate qualitative measurements of optical fibers that have different core diameters and numerical apertures and therefore do not represent the real case but rather present illustrative representations of the extent of homogenization of a light beam in general fibers with different shapes of cores. A real and a fair comparison which shows just the scrambling effect due to the core shape, can be obtained by measuring the beam profile for a light beam carried by optical fibers that have identical core dimensions but different core shapes, as described for example in FIGS. 4A, 4B and 4C. With this understanding, FIGS. 6–9 will now be described.

FIG. 6 illustrates one qualitative example of a beam profile of a light beam emerging from a distal face of a circular core multimode fiber 290. As can be seen from FIG. 6, there are a number of localized high intensity areas of the beam, e.g. areas 300, 302, 304, 306, 308, 310, 312, while there are also regions 314 and 316 that have relatively low beam intensity. Such an uneven distribution of intensity can cause unintended effects when the light beam is put to uses such as in printing. It will be appreciated that such a distribution is highly unpredictable in that, as noted above, the distribution can be time variant and can also vary as a function of changes in the lay of the prior art multimedia fiber.

Figure 7:
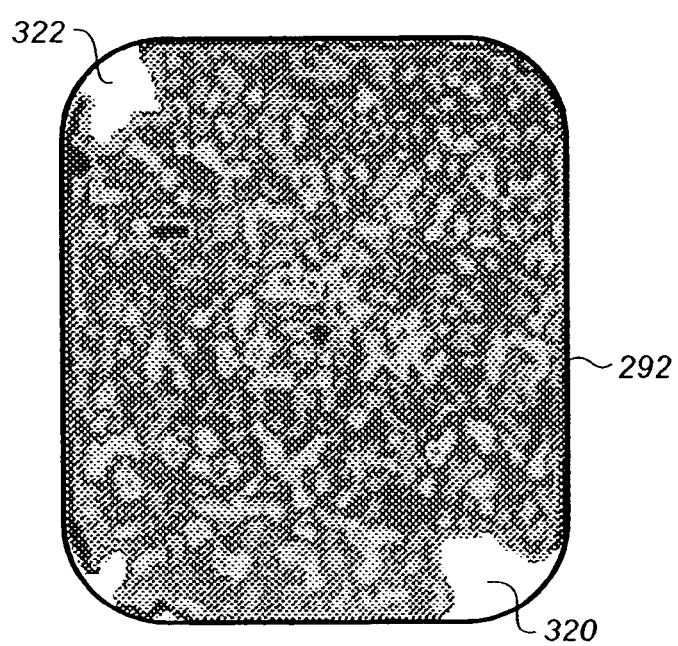
FIG. 7 illustrates a qualitative example of a beam profile for a light beam that has passed through a rectangular fiber optic beam shaper.

FIG. 7 illustrates a qualitative example beam profile of a light beam that has passed through a rectangular core multimode optical fiber 292. As can be seen from the distribution of light and dark areas representing different light intensities, the beam profile is substantially more homogeneous. However, as is also illustrated in this example, defects in a fiber used to form rectangular core multimode optical fiber 292 can create minor variations 320, 322, in the distribution of light that can be avoided, for example, through careful selection and testing of rectangular core multimode optical fiber 292.

Figure 8:
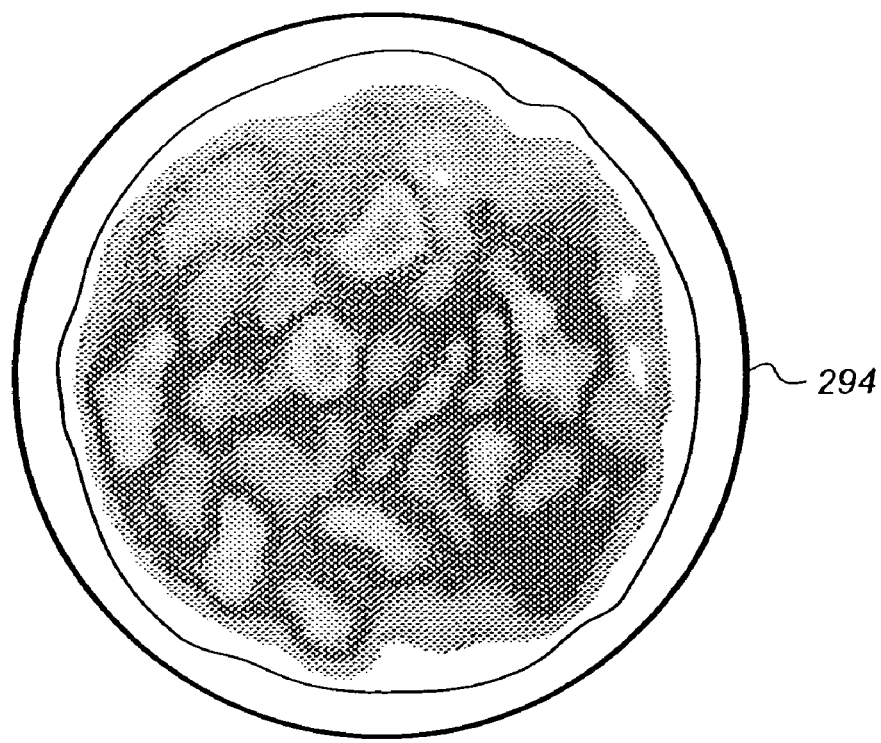
FIG. 8 illustrates another qualitative example beam profile for a light beam that has passed through a circular core optic fiber.

FIG. 8 illustrates another qualitative example of a beam profile of light provided by a conventional circular core multimode fiber 294.

Figure 9:
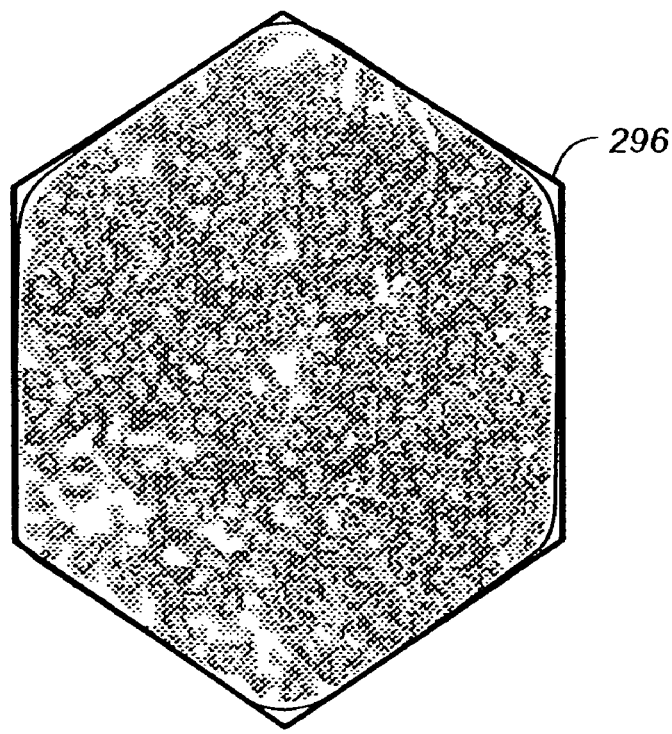
FIG. 9 illustrates an example of a beam profile for a beam that has passed through a hexagonal fiber optic beam shaper.

FIG. 9 illustrates another qualitative example of a beam profile of a light beam as emitted by a hexagonal core multimode optical fiber 296. As shown by the more even distribution of light and dark areas in FIG. 9, this light is steeper and more homogeneous than the light supplied by a conventional circular core multimode fiber.

It will be appreciated that the qualitative examples shown in FIGS. 6–9, are for the purpose of example only and are not limiting.

The invention has been described in detail with particular reference to certain preferred embodiments thereof, but it will be understood that variations and modifications can be effected within the spirit and scope of the invention.

PARTS LIST 10 laser source
20 coupling optics
30 multimode optical fiber
40 support
50 telecentric lens
60 imaging surface
100 optical path
102 proximate face
104 distal face
106 beam shaper multimode optical path
108 circular core multimode optical path
110 laser source
120 coupling optics
130 multimode optical fiber
140 imaging head
150 optical system
160 imaging surface
170 fiber optic beam shaper
180 splicing point
181 splicing point
190 multimode fibers
200 hexagonal core
210 cladding
220 circular core
230 cladding
235 circumference
240 non-circular core
250 first cladding
260 outer cladding
290 circular core multimode optical fiber
292 rectangular core multimode optical fiber
294 circular core multimode optical fiber
296 hexagonal core multimode optical fiber
300 high intensity area 302 high intensity area
304 high intensity area
306 high intensity area
308 high intensity area
310 high intensity area
312 high intensity area
314 low intensity area
316 low intensity area
320 variations
322 variations

The invention claimed is:

1. An optical path for use with a laser source, said optical path comprising:
   a beam shaper multimode optical path having a non-circular core optically coupled to the laser source, said core being shaped to repeatedly reflect a light beam supplied by the laser source to homogenize the light beam; and
   a circular core multimode optical path optically coupled to the beam shaper multimode optical path to receive the homogenized light beam and to shape the homogenized light beam to provide a generally circular beam of homogenized light.

2. The optical path of claim 1, wherein said non-circular core has n generally flat sides, where $n \geq 3$.

3. The optical path of claim 1, wherein said beam shaper multimode optical path has one of a circular clad and a non-circular clad with n sides, where $n \geq 3$.

4. The optical path of claim 1, wherein at least one of said beam shaper multimode optical path and said circular core multimode optical path comprises an optical fiber.

5. The optical path of claim 1, wherein the beam shaper multimode optical path and the circular core multimode optical path have identical numerical apertures.

6. The optical path of claim 1, wherein the beam shaper multimode optical path and the circular core multimode optical path have different numerical apertures.

7. The optical path of claim 1, wherein the beam shaper multimode optical path and the circular core multimode optical path have different core dimensions.

8. The optical path of claim 1, wherein at least one of the beam shaper multimode optical path and the circular core multimode optical path has an absorbing or depressed coating at any place on at least a portion of the non-circular core and the circular core.

9. The optical path of claim 1, wherein said laser source comprises a laser diode.

10. The optical path of claim 1, wherein said laser source provides a multi-mode laser light.

11. The optical path of claim 1, wherein the beam shaper multimode optical path has a non-circular multi-sided core circumscribed by a first cladding, wherein said non-circular multi-sided core has an index of refraction that is higher than the index of refraction of the first cladding.

12. The optical path of claim 11, further comprising an outer cladding circumscribing the first cladding, said outer cladding being at least in part absorptive.

13. The optical path of claim 1, wherein said beam shaper multimode optical path is optically coupled to said laser source by an additional circular core multimode path.

14. An optical imaging head comprising:
   a plurality of laser sources;
   a plurality of optical paths, each optical path having:
      a beam shaper multimode optical fiber having a non-circular core optically coupled to at least one of said laser sources at a proximate face of the optical path;
      a circular core multimode optical fiber optically coupled, at a first end, to the beam shaper multimode optical fiber and defining, at a second end, a distal face of the optical path; and
      a mechanical support for positioning the distal face of each optical path at a predetermined location relative to other distal faces of the other ones of the plurality of optical paths,
   wherein said beam shaper multimode optical fiber reflects a beam of light from the at least one of the coupled laser sources to provide a homogenous light beam and wherein said circular core multimode optical fiber shapes the homogeneous light beam into a circular shaped homogeneous light beam at the distal face.

15. The optical imaging head of claim 14, wherein said laser sources comprise multi-mode laser diodes.

16. The optical imaging head of claim 14, further comprising a lens system positioned to receive light from the distal faces and to focus the light from the optical path to form an image.

17. The optical imaging head of claim 14, wherein said beam shaper multimode optical fiber is optically coupled to the laser source using a multimode optical fiber having a circular core.

18. A method for processing a light beam, the method comprising the steps of:
   receiving a light beam;
   reflectively scrambling the light beam to form generally homogenous light having a non-circular shape; and
   delivering the homogenous light to a circular core multimode light path, that shapes the light beam so that light exiting the circular core multimode light path comprises circular shaped homogenous light.

19. The method of claim 18, further comprising the step of focusing the circular shaped homogenous light onto a photosensitive medium.

20. The method of claim 19, wherein the photosensitive medium is a thermally ablative printing plate.

* * * * *